United States Patent
Comiskey et al.

(12) United States Patent    (10) Patent No.: US 6,327,072 B1
(45) Date of Patent: Dec. 4, 2001

(54) MICROCELL ELECTROPHORETIC DISPLAYS

(75) Inventors: Barrett Comiskey, Cambridge; Russell J. Wilcox, Natick; Ian Morrison, Acton, all of MA (US)

(73) Assignee: E Ink Corporation, Cambridge, MA (US)

( * ) Notice: Subject to any disclaimer, the term of this patent is extended or adjusted under 35 U.S.C. 154(b) by 0 days.

(21) Appl. No.: 09/543,486

(22) Filed: Apr. 6, 2000

Related U.S. Application Data

(60) Provisional application No. 60/127,965, filed on Apr. 6, 1999.

(51) Int. Cl.$^7$ .............................. G02B 26/00; G09G 3/34; B01D 57/02
(52) U.S. Cl. ......................... 359/296; 345/107; 204/450
(58) Field of Search .................................. 345/107, 105, 345/108; 204/450, 600, 606; 359/452, 253, 296

(56) References Cited

U.S. PATENT DOCUMENTS

| | | | |
|---|---|---|---|
| 5,930,026 | * | 7/1999 | Jacobson et al. ............. 359/296 |
| 6,067,185 | * | 5/2000 | Albert et al. ................. 359/296 |
| 6,130,773 | * | 10/2000 | Jacobson et al. ............. 359/296 |

* cited by examiner

*Primary Examiner*—Georgia Epps
*Assistant Examiner*—Tim Thompson
(74) *Attorney, Agent, or Firm*—Testa, Hurwitz & Thibeault, LLP

(57) ABSTRACT

An electrophoretic display element includes at least one substrate and at least one cell defined by a cell wall. The cell is disposed on the substrate and contains a suspending medium. In some embodiments, the cell has a width that is not greater than about three times a height of the cell wall.

14 Claims, 2 Drawing Sheets

MICROCELL ELECTROPHORETIC DISPLAYS

CROSS-REFERENCE TO THE RELATED APPLICATIONS

The present application claims priority to and the benefit of U.S. provisional patent application serial No. 60/127,965, filed Apr. 6, 1999, the contents of which are incorporated herein by reference.

TECHNICAL FIELD

The present invention generally relates to electrophoretic displays and, in particular, to electrophoretic displays using microcells.

BACKGROUND OF THE INVENTION

A variety of electronic display devices operate by the principle of electrophoresis. In such displays, an electrophoretic suspension contains electrophoretically mobile particles. Many electrophoretic displays suffer from several failure modes. In one failure mode, the particles stick or agglomerate together and the desired visual effect is reduced. In another failure mode, the particles migrate across the face of the display (particularly under the influence of gravity). Both of these failure modes result in a nonuniform display.

As such, current electrophoretic display technology produces a display that neither is as bright nor has as much contrast as is desired. Current displays are not capable of achieving uniform brightness or good contrast due to limitations in their construction. Thus, new materials and methods of construction are needed to provide electrophoretic displays with acceptable brightness and contrast.

SUMMARY OF THE INVENTION

The present invention provides electrophoretic displays having a suspending fluid and particles that are contained in microcells of certain geometries. These microcells are disposed on a substrate with walls that define a void. The void can be filled with a suspending medium and particles. Microcells according to the invention provide displays with less particle agglomeration, less unwanted particle migration, better brightness, and/or better contrast than current displays.

Throughout the Specification, the invention is described as a display or an array for ease of description. However, the compositions and processes disclosed herein are equally applicable to "elements". A display or an array are examples of the broader concept of an element. One or more elements can be ordered into a display, array, or other articles of manufacture. Elements can include any of the features described for a display or an array. As used herein, "cell" and "microcell" are used interchangeably, unless otherwise specified, or otherwise apparent from context. Also, as used herein, "suspending fluid" and "suspending medium" are used interchangeably, unless otherwise specified, or otherwise apparent from context.

Generally, particles move within the microcell under the influence of a voltage. Depending upon the location of the particles and the composition of the suspending fluid, various visual states are available. In one highly generalized example, reflecting particles, located at the front of the cell (towards a viewer) in a colored dye, will reflect light and appear "white." When the reflecting particles move towards the rear of the cell (opposite the viewer) upon application of an electric, the particles will be obscured by the dyed fluid and will appear "dark" to a viewer.

In one aspect of the invention, an electrophoretic display element includes at least one substrate and at least one cell that is defined by a cell wall and that is disposed on the substrate. The cell has a width that is not greater than about three times a height of the cell wall, preferably from about two to about three time the height of the cell wall.

The electrophoretic display element can have any of the following features. A cell wall can be less than 10 micrometers wide. The substrate can include a control grid electrode structure, and the cell can include two laminated structures. The cell wall can be formed at least in part with a technique such as photolithography, sandblasting, screenprinting, embossing, laser etching or radiation curing. The substrate can be permeable to a suspending fluid and substantially impermeable to electrophoretic particles, such that the suspending fluid and the particles fill a cavity defined by the cell walls. The substrate can be coated with a polymer, and the polymer can be insoluble in a suspending medium contained within a cavity defined by the cell walls. A suspending fluid contained within a cavity defined by the cell walls can be a substantially clear liquid.

In another aspect of the invention, an electrophoretic display element includes a substrate and at least one cell defined by a cell wall and disposed on the substrate. The cell contains a suspending medium and a plurality of electrophoretic particles, and the cell has a shape that minimizes hydrodynamic motion within the suspending medium within the cell. The hydrodynamic motion can be caused by, for example, convective currents within the suspending medium within the cell.

BRIEF DESCRIPTION OF THE DRAWINGS

The invention, in accordance with preferred and exemplary embodiments, together with further advantages thereof, is more particularly described in the following detailed description, taken in conjunction with the accompanying drawings.

In the drawings, like reference characters generally refer to the same parts throughout the different views. Also, the drawings are not necessarily to scale, emphasis instead generally being placed upon illustrating principles of the invention.

DESCRIPTION

Figure 1:
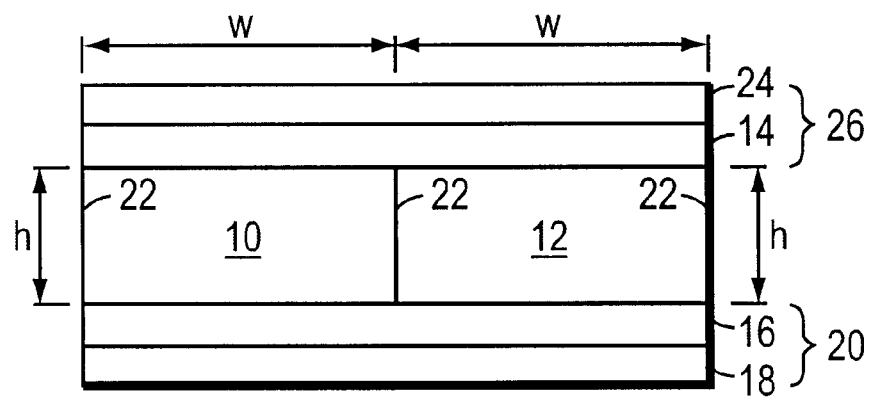
FIG. 1 is a schematic side sectional view of one embodiment of microcells of the invention.

The present invention provides materials and methods that improve performance of electrophoretic display devices. The present invention provides electrophoretic displays having a suspending fluid and particles that are contained in microcells of certain geometries. These microcells are disposed on a substrate with walls that define a void. The void can be filled with the suspending medium and particles. Microcells according to the invention provide displays with less particle agglomeration, less unwanted particle migration, better brightness, and/or better contrast than current displays. Moreover, the microcells have a shape that minimizes unwanted particle movement, occurring because of, for example, convective currents within the suspending medium within the cells.

Many electronic display devices operate by the principle of electrophoresis. In such displays, an electrophoretic suspension is first formed. Typically, this suspension is a darkly dyed oil, but, alternately, a suspending medium of any phase or visual property such as a clear medium, may be employed. Particles within the suspension respond to an electrostatic field to create different visual effects. There are different means by which this visual effect may be accomplished. For example, white particles, located in a dark dye, can be located at the top of the suspension (towards a viewer) and appear white, or the particles can move to the bottom of the suspension (away from the viewer) and appear dark because they are obscured by the dark dye. In other displays, the suspending medium is clear and there are two or more species of particles, such as black and white particles, that move under different electric fields to create different visual effects. Many of these electrophoretic displays, and particularly those that utilize relatively large cells, suffer from several failure modes. In one failure mode, the particles stick or agglomerate together and the desired visual effect is reduced. In another failure mode, the particles migrate across the face of the display (particularly under the influence of gravity). Both of these failure modes result in a nonuniform display.

Many current electrophoretic display devices are an array of electrophoretic cells. The cells are separated by partitions that both prevent migration of particles and lend structural integrity to the display. Typically, such cells are square and relatively large, about 1 mm or more in width. To manufacture this type of device, a bottom substrate is used. Walls are formed to define the cells; liquid suspension is filled into the cells; and the array is sealed with a top layer. These cellular electrophoretic displays suffer from manufacturing drawbacks, because an array of cells must be carefully filled with the electrophoretic suspension. Poor displays result from failure to fill all of the cells uniformly, improperly balancing the number of particles per cell, or permitting air to enter the system.

Generally, according to the invention, an electrophoretic display includes a microcell that includes a bottom substrate, on which cell walls are formed, and a top substrate, which generally seals the interior of the cell. The cell walls and substrates define a microcell cavity into which an electrophoretic fluid can be filled. In one embodiment, the electrophoretic fluid includes one or more species of particle suspended in a suspending fluid. These microcells, for example, absorb or scatter light. One example is a system in which the cells contain one or more species of electrophoretically mobile particles dispersed in a dyed suspending fluid. Another example is a system in which the cells contain two separate species of particles suspended in a clear suspending fluid, in which one species of particle absorbs light (dark), while the other species of particle scatters light (white). There are other extensions (more than two species of particles, with or without a dye, etc.). The particles are commonly solid pigments, dyed particles, or pigment/polymer composites. Moreover, the composition of the electrophoretic suspension can be controlled on a cell-by-cell level. As a result, for example, cyan, magenta and yellow colors can be metered out in an adjoining triad of microcells, permitting full color images to be displayed.

A. Particles

There is much flexibility in the choice of particles for use in electrophoretic displays, as described above. For purposes of this invention, a particle is any component that is charged or capable of acquiring a charge (i.e., has or is capable of acquiring electrophoretic mobility), and, in some cases, this mobility may be zero or close to zero (i.e., the particles will not move). The particles may be neat pigments, dyed (laked) pigments or pigment/polymer composites, or any other component that is charged or capable of acquiring a charge. Typical considerations for the electrophoretic particle are its optical properties, electrical properties, and surface chemistry. The particles may be organic or inorganic compounds, and they may either absorb light or scatter light. The particles for use in the invention may further include scattering pigments, absorbing pigments and luminescent particles. The particles may be retroreflective, such as comer cubes, or they may be electroluminescent, such as zinc sulfide particles, which emit light when excited by an AC field, or they may be photoluminescent. Finally, the particles may be surface treated so as to improve charging or interaction with a charging agent, or to improve dispersibility.

One particle for use in electrophoretic displays of the invention is titania. The titania particles may be coated with a metal oxide, such as aluminum oxide or silicon oxide, for example. The titania particles may have one, two, or more layers of metal-oxide coating. For example, a titania particle for use in electrophoretic displays of the invention may have a coating of aluminum oxide and a coating of silicon oxide. The coatings may be added to the particle in any order.

The electrophoretic particle is usually a pigment, a polymer, a laked pigment, or some combination of the above. A neat pigment can be any pigment, and, usually for a light colored particle, pigments such as rutile (titania), anatase (titania), barium sulfate, kaolin, or zinc oxide are useful. Some typical particles have high refractive indices, high scattering coefficients, and low absorption coefficients. Other particles are absorptive, such as carbon black or colored pigments used in paints and inks. The pigment should also be insoluble in the suspending fluid. Yellow pigments such as diarylide yellow, hansa yellow, and benzidin yellow have also found use in similar displays. Any other reflective material can be employed for a light colored particle, including non-pigment materials, such as metallic particles.

Useful neat pigments include, but are not limited to, $PbCrO_4$, Cyan blue GT 55-3295 (American Cyanamid Company, Wayne, N.J.), Cibacron Black BG (Ciba Company, Inc., Newport, Del.), Cibacron Turquoise Blue G (Ciba), Cibalon Black BGL (Ciba), Orasol Black BRG (Ciba), Orasol Black RBL (Ciba), Acetamine Blac, CBS (E. I. du Pont de Nemours and Company, Wilmington, Del.), Crocein Scarlet N Ex (E. I. du Pont de Nemours and Company) (27290), Fiber Black VF (E. I. du Pont de Nemours and Company) (30235), Luxol Fast Black L (E. I. du Pont de Nemours and Company) (Solv. Black 17), Nirosine Base No. 424 (E. I. du Pont de Nemours and Company) (50415 B), Oil Black BG (E. I. du Pont de Nemours and Company) (Solv. Black 16), Rotalin Black RM (E. I. du Pont de Nemours and Company), Sevron Brilliant Red 3 B (E. I. du Pont de Nemours and Company); Basic Black DSC (Dye Specialties, Inc.), Hectolene Black (Dye Specialties, Inc.), Azosol Brilliant Blue B (GAF, Dyestuff and Chemical Division, Wayne, N.J.) (Solv. Blue 9), Azosol Brilliant Green BA (GAF) (Solv. Green 2), Azosol Fast Brilliant Red B (GAF), Azosol Fast Orange RA Conc. (GAF) (Solv. Orange 20), Azosol Fast Yellow GRA Conc. (GAF) (13900 A), Basic Black KMPA (GAF), Benzofix Black CW-CF (GAF) (35435), Cellitazol BNFV Ex Soluble CF (GAF) (Disp. Black 9), Celliton Fast Blue AF Ex Conc (GAF) (Disp. Blue 9), Cyper Black IA (GAF) (Basic Blk. 3), Diamine Black CAP Ex Conc (GAF) (30235), Diamond Black EAN Hi Con. CF (GAF) (15710), Diamond Black PBBA Ex (GAF) (16505); Direct Deep Black EA Ex CF (GAF) (30235), Hansa Yellow G (GAF) (11680); Indanthrene Black BBK Powd. (GAF) (59850), Indocarbon CLGS Conc. CF (GAF) (53295), Katigen Deep Black NND Hi Conc. CF (GAF) (15711), Rapidogen Black 3 G (GAF) (Azoic Blk. 4); Sulphone Cyanine Black BA-CF (GAF) (26370), Zambezi Black VD Ex Conc. (GAF) (30015); Rubanox Red CP-1495 (The Sherwin-Williams Company, Cleveland, Ohio) (15630); Raven 11 (Columbian Carbon Company, Atlanta, Ga.), (carbon black aggregates with a particle size of about 25 $\mu$m), Statex B-12 (Columbian Carbon Co.) (a furnace black of 33 $\mu$m average particle size), and chrome green.

Particles may also include laked, or dyed, pigments. Laked pigments are particles that have a dye precipitated on them or which are stained. Lakes are metal salts of readily soluble anionic dyes. These are dyes of azo, triphenylmethane or anthraquinone structure containing one or more sulphonic or carboxylic acid groupings. They are usually precipitated by a calcium, barium or aluminum salt onto a substrate. Typical examples are peacock blue lake (CI Pigment Blue 24) and Persian orange (lake of CI Acid Orange 7), Black M Toner (GAF) (a mixture of carbon black and black dye precipitated on a lake).

A dark particle of the dyed type may be constructed from any light absorbing material, such as carbon black, or inorganic black materials. The dark material may also be selectively absorbing. For example, a dark green pigment may be used. Black particles may also be formed by staining latices with metal oxides, such latex copolymers consisting of any of butadiene, styrene, isoprene, methacrylic acid, methyl methacrylate, acrylonitrile, vinyl chloride, acrylic acid, sodium styrene sulfonate, vinyl acetate, chlorostyrene, dimethylaminopropylmethacrylamide, isocyanoethyl methacrylate and N(isobutoxymethacrylamide), and optionally including conjugated diene compounds such as diacrylate, triacrylate, dimethylacrylate and trimethacrylate. Black particles may also be formed by a dispersion polymerization technique.

In the systems containing pigments and polymers, the pigments and polymers may form multiple domains within the electrophoretic particle, or be aggregates of smaller pigment/polymer combined particles. Alternatively, a central pigment core may be surrounded by a polymer shell. The pigment, polymer, or both can contain a dye. The optical purpose of the particle may be to scatter light, absorb light, or both. Useful sizes may range from 1 nm up to about 100 $\mu$m, as long as the particles are smaller than the bounding microcell. The density of the electrophoretic particle may be substantially matched to that of the suspending (i.e., electrophoretic) fluid. As defined herein, a suspending fluid has a density that is "substantially matched" to the density of the particle if the difference in their respective densities is between about zero and about two grams/milliliter ("g/ml"). This difference is preferably between about zero and about 0.5 g/ml.

Useful polymers for the particles include, but are not limited to: polystyrene, polyethylene, polypropylene, phenolic resins, E. I. du Pont de Nemours and Company Elvax resins (ethylene-vinyl acetate copolymers), polyesters, polyacrylates, polymethacrylates, ethylene acrylic acid or methacrylic acid copolymers (Nucrel Resins—E. I. du Pont de Nemours and Company, Primacor Resins—Dow Chemical), acrylic copolymers and terpolymers (Elvacite Resins, E. I. du Pont de Nemours and Company) and PMMA. Useful materials for homopolymer/pigment phase separation in high shear melt include, but are not limited to, polyethylene, polypropylene, polymethylmethacrylate, polyisobutylmethacrylate, polystyrene, polybutadiene, polyisoprene, polyisobutylene, polylauryl methacrylate, polystearyl methacrylate, polyisobomyl methacrylate, poly-t-butyl methacrylate, polyethyl methacrylate, polymethyl acrylate, polyethyl acrylate, polyacrylonitrile, and copolymers of two or more of these materials. Some useful pigment/polymer complexes that are commercially available include, but are not limited to, Process Magenta PM 1776 (Magruder Color Company, Inc., Elizabeth, N.J.), Methyl Violet PMA VM6223 (Magruder Color Company, Inc., Elizabeth, N.J.), and Naphthol FGR RF6257 (Magruder Color Company, Inc., Elizabeth, N.J.).

The pigment-polymer composite may be formed by a physical process, (e.g., attrition or ball milling), a chemical process (e.g., microencapsulation or dispersion polymerization), or any other process known in the art of particle production. For example, the processes and materials for both the fabrication of liquid toner particles and the charging of those particles may be relevant.

New and useful electrophoretic particles may still be discovered, but a number of particles already known to those skilled in the art of electrophoretic displays and liquid toners can also prove useful. In general, the polymer requirements for liquid toners and microcell-bounded electrophoretic inks are similar, in that the pigment or dye must be easily incorporated therein, either by a physical, chemical, or physicochemical process, may aid in the colloidal stability, and may contain charging sites or may be able to incorporate materials which contain charging sites. One general requirement from the liquid toner industry that is not shared by microcell-bounded electrophoretic inks is that the toner must be capable of "fixing" the image, i.e., heat fusing together to create a uniform film after the deposition of the toner particles.

Typical manufacturing techniques for particles may be drawn from the liquid toner and other arts and include ball milling, attrition, jet milling, etc. The process will be illustrated for the case of a pigmented polymeric particle. In such a case the pigment is compounded in the polymer, usually in some kind of high shear mechanism such as a screw extruder. The composite material is then (wet or dry) ground to a starting size of around 10 $\mu$m. It is then dispersed in a carrier liquid, for example ISOPAR® (Exxon, Houston, Tex.), optionally with some charge control agent(s), and milled under high shear for several hours down to a final particle size and/or size distribution.

Another manufacturing technique for particles is to add the polymer, pigment, and suspending fluid to a media mill. The mill is started and simultaneously heated to temperature at which the polymer swells substantially with the solvent. This temperature is typically near 100° C. In this state, the pigment is easily encapsulated into the swollen polymer. After a suitable time, typically a few hours, the mill is gradually cooled back to ambient temperature while stirring. The milling may be continued for some time to achieve a small enough particle size, typically a few micrometers in diameter. The charging agents may be added at this time. Optionally, more suspending fluid may be added.

Chemical processes such as dispersion polymerization, mini- or micro-emulsion polymerization, suspension polymerization precipitation, phase separation, solvent evaporation, in situ polymerization, seeded emulsion polymerization, or any process which falls under the general category of microencapsulation may be used. A typical process of this type is a phase separation process wherein a dissolved polymeric material is precipitated out of solution onto a dispersed pigment surface through solvent dilution, evaporation, or a thermal change. Other processes include chemical means for staining polymeric latices, for example with metal oxides or dyes.

B. Suspending Fluid

The suspending fluid containing the particles can be chosen based on properties such as density, refractive index, and solubility. A preferred suspending fluid has a low dielectric constant (about 2), high volume resistivity (about $10^{15}$ ohm-cm), low viscosity (less than 5 centistokes ("cst")), parts per million ("ppm")), high specific gravity (greater than 1.5), a high boiling point (greater than 90° C.), and a low refractive index (less than 1.2).

The choice of suspending fluid may be based on concerns of chemical inertness, density matching to the electrophoretic particle, or chemical compatibility with both the electrophoretic particle and bounding cell wall. The viscosity of the fluid should be low when movement of the particles is desired. The refractive index of the suspending fluid may also be substantially matched to that of the particles. As used herein, the refractive index of a suspending fluid "is substantially matched" to that of a particle if the difference between their respective refractive indices is between about zero and about 0.3, and is preferably between about 0.05 and about 0.2.

Additionally, the fluid may be chosen to be a poor solvent for some polymers, which is advantageous for use in the fabrication of microparticles, because it increases the range of polymeric materials useful in fabricating particles of polymers and pigments. Organic solvents, such as halogenated organic solvents, saturated linear or branched hydrocarbons, silicone oils, and low molecular weight halogen-containing polymers are some useful suspending fluids. The suspending fluid may comprise a single fluid. The fluid will, however, often be a blend of more than one fluid in order to tune its chemical and physical properties. Furthermore, the fluid may contain surface modifiers to modify the surface energy or charge of the electrophoretic particle or bounding microcell. Reactants or solvents for the microcell wall forming process (oil soluble monomers, for example) can also be contained in the suspending fluid. Charge control agents can also be added to the suspending fluid.

Useful organic solvents include, but are not limited to, epoxides, such as decane epoxide and dodecane epoxide; vinyl ethers, such as cyclohexyl vinyl ether and Decave® (International Flavors & Fragrances, Inc., New York, N.Y.); and aromatic hydrocarbons, such as toluene and naphthalene. Useful halogenated organic solvents include, but are not limited to, tetrafluorodibromoethylene, tetrachloroethylene, trifluorochloroethylene, 1,2,4-trichlorobenzene, carbon tetrachloride. These materials have high densities. Useful hydrocarbons include, but are not limited to, dodecane, tetradecane, the aliphatic hydrocarbons in the Isopar® series (Exxon, Houston, Tex.), Norpar® (series of normal paraffinic liquids), Shell-Sol®(Shell, Houston, Tex.), and Sol-Trol® (Shell), naphtha, and other petroleum solvents. These materials usually have low densities. Useful examples of silicone oils include, but are not limited to, octamethyl cyclosiloxane and higher molecular weight cyclic siloxanes, poly (methyl phenyl siloxane), hexamethyldisiloxane, and polydimethylsiloxane. These materials usually have low densities. Useful low molecular weight halogen-containing polymers include, but are not limited to, poly(chlorotrifluoroethylene) polymer (Halogenated hydrocarbon Inc., River Edge, N.J.), Galden® (a perfluorinated ether from Ausimont, Morristown, N.J.), or Krytox® from E. I. du Pont de Nemours and Company (Wilmington, Del.). In a preferred embodiment, the suspending fluid is a poly(chlorotrifluoroethylene) polymer. In a particularly preferred embodiment, this polymer has a degree of polymerization from about 2 to about 10. Many of the above materials are available in a range of viscosities, densities, and boiling points.

The fluid can be capable of being formed into small droplets prior to a microcell being formed. Processes for forming small droplets include flow-through jets, membranes, nozzles, or orifices, as well as shear-based emulsifying schemes. The formation of small drops may be assisted by electrical or sonic fields. Surfactants and polymers can be used to aid in the stabilization and emulsification of the droplets. One surfactant for use in displays of the invention is sodium dodecylsulfate.

It can be advantageous in some displays for the suspending fluid to contain an optically absorbing dye. This dye must be soluble in the fluid, but will generally be insoluble in the other components of the microcell. There is much flexibility in the choice of dye material. The dye can be a pure compound, or blends of dyes to achieve a particular color, including black. The dyes can be fluorescent, which would produce a display in which the fluorescence properties depend on the position of the particles. The dyes can be photoactive, changing to another color or becoming colorless upon irradiation with either visible or ultraviolet light, providing another means for obtaining an optical response. Dyes could also be polymerizable, forming a solid absorbing polymer inside the cell wall.

There are many dyes that can be chosen for use in microcell electrophoretic displays. Properties important here include light fastness, solubility in the suspending liquid, color, and cost. These are generally from the class of azo, anthraquinone, and triphenylmethane type dyes and may be chemically modified so as to increase the solubility in the oil phase and reduce the adsorption by the particle surface.

A number of dyes already known to those skilled in the art of electrophoretic displays will prove useful. Useful azo dyes include, but are not limited to: the Oil Red dyes, and the Sudan Red and Sudan Black series of dyes. Useful anthraquinone dyes include, but are not limited to: the Oil Blue dyes, and the Macrolex Blue series of dyes. Useful triphenylmethane dyes include, but are not limited to, Michler's hydrol, Malachite Green, Crystal Violet, and Auramine O.

C. Charge Control Agents and Particle Stabilizers

Charge control agents are used to provide good electrophoretic mobility to the electrophoretic particles. Stabilizers are used to prevent agglomeration of the electrophoretic particles, as well as prevent the electrophoretic particles from irreversibly depositing onto the microcell wall. Either component can be constructed from materials across a wide range of molecular weights (low molecular weight, oligomeric, or polymeric), and may be pure or a mixture. The charge control agent used to modify and/or stabilize the particle surface charge is applied as generally known in the arts of liquid toners, electrophoretic displays, non-aqueous paint dispersions, and engine-oil additives. In all of these arts, charging species may be added to non-aqueous media in order to increase electrophoretic mobility or increase electrostatic stabilization. The materials can improve steric stabilization as well. Different theories of charging are postulated, including selective ion adsorption, proton transfer, and contact electrification.

An optional charge control agent or charge director may be used. These constituents typically consist of low molecular weight surfactants, polymeric agents, or blends of one or more components and serve to stabilize or otherwise modify the sign and/or magnitude of the charge on the electrophoretic particles. The charging properties of the pigment itself may be accounted for by taking into account the acidic or basic surface properties of the pigment, or the charging sites may take place on the carrier resin surface (if present), or a combination of the two. Additional pigment properties which may be relevant are the particle size distribution, the chemical composition, and the lightfastness. The charge control agent used to modify and/or stabilize the particle surface charge may be applied as generally known in the arts of liquid toners, electrophoretic displays, non-aqueous paint dispersions, and engine-oil additives. In all of these arts, charging species may be added to non-aqueous media in order to increase electrophoretic mobility or increase electrostatic stabilization. The materials can improve steric stabilization as well. Different theories of charging are postulated, including selective ion adsorption, proton transfer, and contact electrification.

Charge adjuvants may also be added. These materials increase the effectiveness of the charge control agents or charge directors. The charge adjuvant may be a polyhydroxy compound or an aminoalcohol compound, which are preferably soluble in the suspending fluid in an amount of at least 2% by weight. Examples of polyhydroxy compounds which contain at least two hydroxyl groups include, but are not limited to, ethylene glycol, 2,4,7,9-tetramethyl-decyne-4,7diol, poly (propylene glycol), pentaethylene glycol, tripropylene glycol, triethylene glycol, glycerol, pentaerythritol, glycerol tris(12-hydroxystearate), propylene glycol monohydroxystearate, and ethylene glycol monohydroxystearate. Examples of aminoalcohol compounds which contain at least one alcohol function and one amine function in the same molecule include, but are not limited to, triisopropanolamine, triethanolamine, ethanolamine, 3-amino-propanol, o-aminophenol, 5-amino-1-pentanol, and tetrakis(2-hydroxyethyl)ethylenediamine. The charge adjuvant is preferably present in the suspending fluid in an amount of about 1 to about 100 milligrams per gram ("mg/g") of the particle mass, and more preferably about 50 to about 200 mg/g.

The surface of the particle may also be chemically modified to aid dispersion, to improve surface charge, and to improve the stability of the dispersion, for example. Surface modifiers include organic siloxanes, organohalogen silanes and other functional silane coupling agents (Dow Coming® Z-6070, Z-6124, and 3 additive, Midland, Mich.); organic titanates and zirconates (Tyzor® TOT, TBT, and TE Series, E. I. du Pont de Nemours and Company, Wilmington, Del.); hydrophobing agents, such as long chain (C12 to C50) alkyl and alkyl benzene sulphonic acids, fatty amines or diamines and their salts or quatenary derivatives; and amphipathic polymers which can be covalently bonded to the particle surface.

In general, it is believed that charging results as an acid-base reaction between some moiety present in the continuous phase and the particle surface. Thus useful materials are those which are capable of participating in such a reaction, or any other charging reaction as known in the art.

Different non-limiting classes of charge control agents which are useful include organic sulfates or sulfonates, metal soaps, block or comb copolymers, organic amides, organic zwitterions, and organic phosphates and phosphonates. Useful organic sulfates and sulfonates include, but are not limited to, sodium bis(2-ethylhexyl) sulfosuccinate, calcium dodecyl benzene sulfonate, calcium petroleum sulfonate, neutral or basic barium dinonylnaphthalene sulfonate, neutral or basic calcium dinonylnaphthalene sulfonate, dodecylbenzenesulfonic acid sodium salt, and ammonium lauryl sulphate. Useful metal soaps include, but are not limited to, basic or neutral barium petronate, calcium petronate, Co-, Ca-, Cu-, Mn-, Ni-, Zn-, and Fe-salts of naphthenic acid, Ba-, Al-, Zn-, Cu-, Pb-, and Fe-salts of stearic acid, divalent and trivalent metal carboxylates, such as aluminum tristearate, aluminum octanoate, lithium heptanoate, iron stearate, iron distearate, barium stearate, chromium stearate, magnesium octanoate, calcium stearate, iron naphthenate, and zinc naphthenate, Mn- and Zn-heptanoate, and Ba-, Al-, Co-, Mn-, and Zn-octanoate. Useful block or comb copolymers include, but are not limited to, AB diblock copolymers of (A) polymers of 2-(N,N)-dimethylaminoethyl methacrylate quatemized with methyl-p-toluenesulfonate and (B) poly-2-ethylhexyl methacrylate, and comb graft copolymers with oil soluble tails of poly (12-hydroxystearic acid) and having a molecular weight of about 1800, pendant on an oil-soluble anchor group of poly (methyl methacrylate-methacrylic acid). Useful organic amides include, but are not limited to, polyisobutylene succinimides such as OLOA 1200, and N-vinyl pyrrolidone polymers. Useful organic zwitterions include, but are not limited to, lecithin. Useful organic phosphates and phosphonates include, but are not limited to, the sodium salts of phosphated mono- and di-glycerides with saturated and unsaturated acid substituents.

Particle dispersion stabilizers may be added to prevent particle flocculation or attachment to the microcell walls. For the typical high resistivity liquids used as suspending fluids in electrophoretic displays, nonaqueous surfactants may be used. These include, but are not limited to, glycol ethers, acetylenic glycols, alkanolarnides, sorbitol derivatives, alkyl amines, quaternary amines, imidazolines, dialkyl oxides, and sulfosuccinates.

D. Microcell

Figure 2:
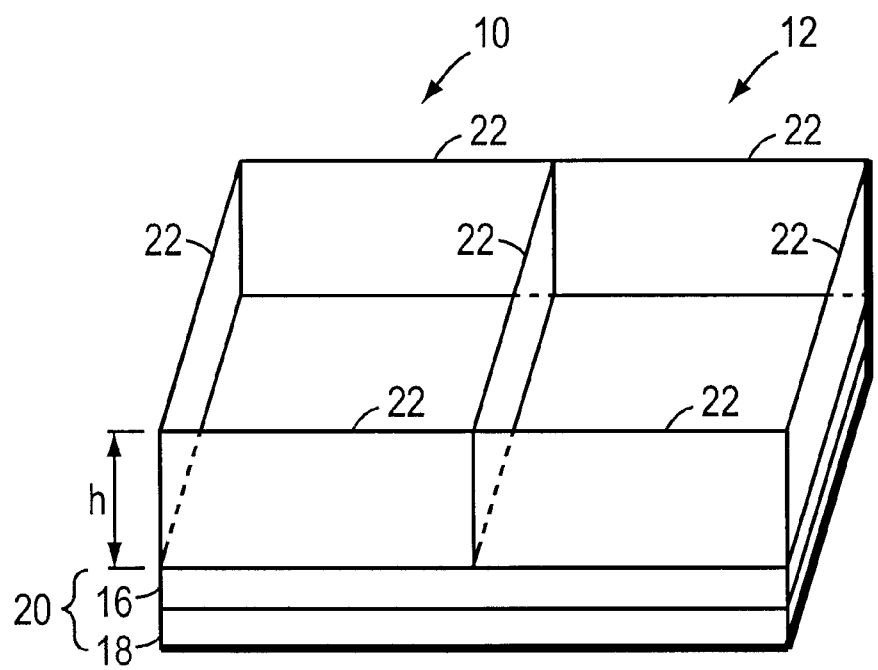
FIG. 2 is a schematic top perspective view of the embodiment of FIG. 1 with several layers removed.

The particles, suspending fluids, and/or charge control agents and particle stabilizers described above are loaded into a microcell. Referring to FIGS. 1 and 2, microcells 10, 12 are disposed adjacent, and partially defined by, a bottom substrate 20. In this embodiment, the bottom substrate 20 has several layers 16, 18, a base layer 16 and an electrode 18. The base layer 16, forms the bottom of the microcells 10, 12, and interfaces with the walls 22 surrounding the cells 10, 12. The electrode 18 (such as a control grid) is adjacent the base layer 16. A top substrate 26, is located opposite the bottom substrate 20, and is made of several layers 14, 24, a top layer 14, that seals the top of the microcells 10, 12, and a second electrode 24. Although this embodiment is shown having two substrates 20, 26, each with two layers, alternative embodiments can have fewer or more layers, depending upon the materials used. For example, the cell walls 22 can be directly formed on an electrode and sealed with a second electrode, forming a substrate with only one layer. The microcells 10, 12 have a height (h) and a width (w). The width (w) is measured along the substrate 20, as described in the following paragraph. The height (h) is measured along a cell wall 22, perpendicular to the width (w). Typically, microcells have a hollow cavity defined by the cell walls and at least one of the substrates. The particles, suspending medium, and/or charge control agents and particle stabilizers are loaded into the interior cavity of the microcell.

Microcells of the invention can utilize a variety of shapes and are relatively small. The microcells preferably are square in shape (as shown in the top perspective view of FIG. 2) and arranged in a matrix. Such microcells are about 5 micrometers to about 200 micrometers wide, preferably about 10 micrometers to about 100 micrometers wide. The terms 'wide' and 'width', refer to the greatest dimension of the microcell. For example, the 'width' of a square microcell is √2 times the length of a side of the square and the 'width' of a circular microcell is the diameter of the circle.

Figure 3:
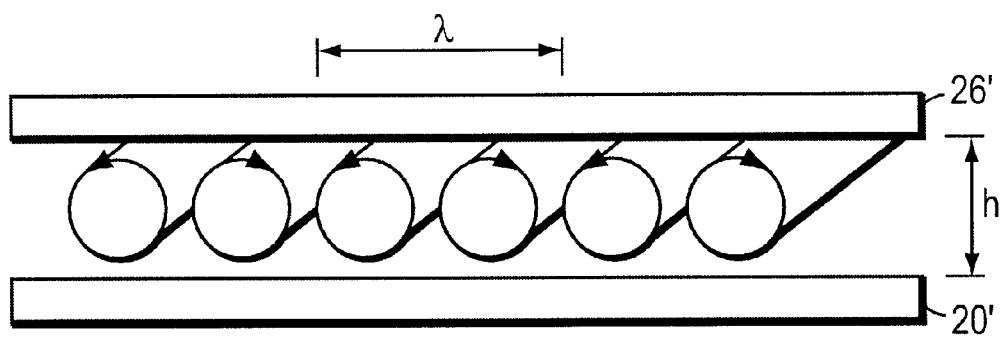
FIG. 3 is a depiction of fluid convection.

During operation of many electrophoretic displays, "hydrodynamic" motion of the suspending medium within the cell can lead to poor visual appearance by causing the particles to move in an unintended manner. One cause of this undesirable particle movement is convection currents within the suspending medium within the cells. It is known in the prior art that body forces in viscous fluids will lead to double rolls with a wavelength of twice the depth of the fluid. This effect is independent of the type of force. Each double roll extends laterally for a distance of one wavelength. FIG. 3 depicts a fluid layer bounded by substrates 20' and 26'. Three double rolls are depicted and the wavelength, λ, of one double roll is indicated, λ being equal to two times the height. Each "roll" in the double roll is seen to engage in mirror image, circular motion.

This effect can be reduced by limiting the width of the microcell cavity to be no more than about three times, and preferably no more than two times, the height of the microcell cavity. For microcells of such width to height ratio, the cell walls provide a substantial impediment to the creation and motion of the above described rolling effect. The precise width at which a desirable effect is achieved will vary somewhat with the particular choice of fluid and the particular choice of microcell shape. Width, as described above, refers to lateral dimensions along a bottom substrate (which can be an electrode), whereas height, as described above, refers to the height of the cell wall which correlates with the gap between top and bottom substrates (such as two electrodes.)

The precise microcell shape can be varied to obtain varying effects on motion of fluid in the microcell. Though a square shape is desirable for manufacturing purposes and visual performance of a display, other microcell shapes can be employed. For example, a very irregular shape can be employed, such that the width, as defined above, is greater than three times the cell height with fluid motion that is still effectively damped. Such an irregularly-shaped microcell, however, would have limited utility for use in a display.

The walls used to separate the microcells constitute areas of the display that do not generate a visual effect, reducing the aperture ratio of the display. That is, any of the cell walls are areas of a display that are not visually active and detract from the uniformity of a changeable display. By keeping the walls as thin as possible, the amount of changeable viewing surface is maximized and the display does not suffer from having a minimal amount of visually inactive areas. Thus, the walls should be as thin as possible while still ensuring structural integrity, and the microcells should be as wide as possible without permitting unfortunate hydrodynamic flows.

In one embodiment, a dye-based electrophoretic system is constructed from microcells that are about 50 micrometers high and about 120 micrometers wide. In another embodiment, an electrophoretic system employing a clear medium in which two species of contrasting particles are suspended is constructed of microcel is that are about 20 micrometers high and that are about 50 micrometers wide. The microcell walls can be formed by photolithography methods and are less than about 10 micrometers wide, and are preferably about 3 micrometers to about 5 micrometers wide.

To achieve adequately thin and strong cell walls, any suitable material and manufacturing technique may be employed. A variety of methods may be used, including additive methods that create walls upon a substrate, subtractive methods that hollow wells within a substrate, or a combination thereof. Microcell walls can be formed with techniques such as microprinting, photolithography, sandblasting, screenprinting, vacuum deposition, electron beam curing, laser etching including excimer laser etching, chemical etching, curing by radiation including ultraviolet light, infrared etching, and/or stereolithography. Also, methods and materials useful in the art of manufacturing plasma display panel barrier ribs can be used.

Methods that are capable of making short walls can, in some cases, be repeated to build up a taller wall. For example, in some embodiments, it is useful to combine two microcell layers. In this situation, each microcell layer has a wall that is a fraction of the desired final microcell height, and the two layers are combined which, together, form a wall of the desired final height. This step can be preceded by other steps. For example, a glue or conductive electrode can be inserted on the cell walls, in the cavities defined by the microcells, or on the sides of the walls of the microcell cavities. These steps facilitate forming a control grid structure for addressing and controlling an electrophoretic display. Alternatively, a grid is formed and then adhered to a substrate that forms the bottom or top of the microcell. The grid may be fashioned, for example, with a technique such as etching, punching, slitting and stretching, or stamping a substrate. This grid typically is formed from overlapping rows and columns of a conductive or semiconductive material.

In another approach to forming the cell walls, a polymer is embossed onto a substrate to create a micro-ribbed structure. In yet another approach to forming the cell walls, narrow, hollow tubes ("straws") having the desired width are extruded or otherwise suitably created. A group of straws are collected and bundled such that they are substantially parallel to each other. The straws should be closely packed, which can be achieved by applying pressure to the straws. The straws can be bonded together by any suitable means, such as heating the straws. The ends of the straws then are sliced, for example with a laser, such that a thin (of the desired height) grid of closely-packed walls is thereby created.

Having formed the microcells in the proper geometry, the microcells are filled with an electrophoretic suspension, and the microcells are sealed. Typically, this electrophoretic suspension includes at least a suspending fluid and particles. Many alternative suspensions and components of these suspensions are described above in more detail. Many techniques can be used to fill the microcells, however, these techniques should achieve a homogeneous electrophoretic suspension and minimize entry of air into the system. According to one method, an electrophoretic suspension is poured across the array of microcells to fill the cells. Then, a top substrate is positioned over the open end of the array (assuming that the microcells are already attached to a bottom substrate), and a roller presses the layers together. The roller squeezes excess electrophoretic suspension, as well as air, out of the microcell cavities as it proceeds from one end of the array to the other. The step of removing excess electrophoretic suspension and air can be accomplished as part of a laminating step, or it may be closely followed by a bonding step. When sealing the top substrate, glue may be applied across the top of the microcell walls. Alternately, less or no glue is used, except around the edges of the display, and top layer is held against the microcell walls with the tension of an outer seal.

Metered inkjet deposition, screenprinting, or other coating and printing methods can be used to fill the microcell cavities, although not all inkjet methods are viable. If the electrophoretic display suspension is an oil, then inkjet heads that operate by heating an aqueous liquid are not useful. One embodiment employs an inkjet head that operates using piezoelectric elements. Alternately, any metering method can be used to fill the cells, including a nozzle dispensing the electrophoretic suspension under pressure or gravity.

In other embodiments, one of the substrates is a porous material, such as a nuclear pore filter material, that permits the electrophoretic medium, such as oil, to flow through the material but prevents the particles from flowing through the material. Such a system permits a variety of filling methods. For example, microcells are formed on a bottom porous substrate. A dusting of particles is applied across the entire substrate (from the top) in a substantially homogeneous manner, such that particles are located within microcell cavities. Masks can be employed such that specific cells are dusted with specific colored particles. A non-porous top substrate then is laid across the microcells and bonded to the tops of the cell walls. Optionally a vacuum is applied, voiding the system of air but not voiding the system of particles because the particles are too large to pass through the porous layer. Finally, the display that is substantially impermeable at the top, but not at the bottom, is dipped in a liquid electrophoretic medium, such as an oil. The oil can be introduced into the preformed cell by capillary action or vacuum pressure. The oil enters the cavities of each microcell through the porous bottom substrate. The porous bottom substrate then is wiped to remove excess material. A non-porous membrane then is laminated or bonded to the bottom substrate, such that the microcells are fully bounded and substantially impermeable to the oil and particles. As an alternative to dipping, the array of microcells can be inserted into a chamber that is filled with a hot vapor. When the vapor condenses, it forms the electrophoretic display medium in the cavities of the microcells. A chilling device can be employed to further control the condensing process.

In a related embodiment, both the top and bottom substrates are porous. After the layers have been bonded together, with the cell walls, the system is dipped into a suspending medium such as oil, which enters the cells through both porous layers, and remains in the microcells, by capillary action. The system then is laminated between a top, non-porous layer and a bottom, 5 non-porous layer to prevent the exit of the suspending medium.

In any of the above approaches, the top substrate, before it is applied to the top of the microcell walls, can be coated with an uncured polymer that is not soluble in the electrophoretic suspending medium to be used. After the top substrate is held or squeezed against the microcell walls, a curing mechanism, such as heat or ultraviolet light, cures the polymer and fuses the top substrate to the microcell walls.

Another method of filling the microcell cavities uses a bottom and top substrate. One or both of the substrates include a fraction of the desired final height of the microcell wall. The two substrates are brought together, while submerged in a bath of the electrophoretic suspension, typically with stirring to achieve a homogeneous particle distribution. As the two substrates make contact, a forming device pinches off rows of microcells such that each microcell contains the electrophoretic suspension. The microcells are made permanent by sealing the two substrates together with pressure or by bonding the two substrates with heat, radiation, glue and/or pressure. If neither of the two substrates have a fraction of the microcell wall, microcells can be formed in a manner similar to the operation of a waffle iron. For example, the two substrates are squeezed together in a mold and fused along a grid-like pattern.

In another embodiment, the filling and sealing steps for individual microcells are avoided by forming the display as one pocket that is filled and sealed. Then, the microcell walls are formed in situ post facto. For example, a suitable polymer is added to the electrophoretic display suspension. After the pocket is filled and sealed, electrodes in a grid-like pattern are employed under alternating current to cause the polymer to dielectrophoretically collect together in a pattern matching the electrode grid pattern. Once in position, the polymer is fused by any suitable means to form the cell wall. Alternatively, the polymer can be formed by a phase separation (i.e., thermal, solvent evaporative, or radiation induced) process such that the cavities formed in the polymer matrix have the appropriate aspect ratios of height to width. Another alternative method for forming walls in situ is to add an additional species of particle to the electrophoretic display suspension that will respond to an applied field pattern to form the walls. For example, large magnetically responsive particles incorporating a polymer are added. The particles respond to an external magnetic pattern to migrate to the wall locations (as determined by the magnetic pattern). Again, the walls are fused together and act as stable walls, for example, with thermal energy.

The devices described above are suitable for use as the visual contrast portion of an electronic display or as a rewritable paper-like substrate that may be addressed by various means including nonlinear switching elements or an electrostatic print head or stylus. Regardless of application, "electronic display media" refers to a filled and sealed microcell structure having top and bottom substrates that is capable, when appropriately addressed, of imaging desired visual effects.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. An electrophoretic display element comprising:
   at least one substrate and
   at least one cell, the cell defined by a cell wall and disposed on the substrate, wherein the cell has a width that is not greater than about three times a height of the cell wall.

2. The element of claim 1 wherein the cell has a width that is from about two to about three times a height of the cell wall.

3. The element of claim 1 in which the cell wall is less than 10 micrometers wide.

4. The element of claim 1 wherein the substrate comprises a control grid electrode structure.

5. The element of claim 4 wherein the cell comprises two laminated structures.

6. The element of claim 1 wherein the cell wall is formed at least in part with a technique selected from the group consisting of photolithography, sandblasting, screenprinting, embossing, laser etching and radiation curing.

7. The element of claim 1 wherein the substrate is permeable to a suspending fluid and substantially impermeable to electrophoretic particles, such that the suspending fluid and the particles fill a cavity defined by the cell walls.

8. The element of claim 1 wherein the substrate is coated with a polymer, the polymer being insoluble in a suspending medium contained within a cavity defined by the cell walls.

9. The element of claim 1 wherein a suspending fluid contained within a cavity defined by the cell walls comprises a substantially clear liquid.

10. The element of claim 1 wherein the width is in the range of 5 to 200 micrometers.

11. The element of claim 1 wherein the height is in the range of 10 to 100 micrometers.

12. An electrophoretic display element comprising at least one substrate and at least one cell defined by a cell wall and disposed on the substrate, the cell containing a suspending medium and a plurality of electrophoretic particles, wherein the cell has a shape that minimizes hydrodynamic motion within the suspending medium.

13. The element of claim 12 wherein the hydrodynamic motion comprises a convective current.

14. The element of claim 13 wherein the height is in the range of 10 to 100 micrometers.

* * * * *

(12) EX PARTE REEXAMINATION CERTIFICATE (5450th)
United States Patent
Comiskey et al.

(10) Number: US 6,327,072 C1
(45) Certificate Issued: Jul. 11, 2006

(54) MICROCELL ELECTROPHORETIC DISPLAYS

(75) Inventors: Barrett Comiskey, Cambridge, MA (US); Russell J. Wilcox, Natick, MA (US); Ian Morrison, Acton, MA (US)

(73) Assignee: E Ink Corporation, Cambridge, MA (US)

Reexamination Request:
No. 90/006,347, Aug. 5, 2002

Reexamination Certificate for:
Patent No.: 6,327,072
Issued: Dec. 4, 2001
Appl. No.: 09/543,486
Filed: Apr. 6, 2000

Related U.S. Application Data

(60) Provisional application No. 60/127,965, filed on Apr. 6, 1999.

(51) Int. Cl.
*G02B 26/00* (2006.01)
*G09G 3/34* (2006.01)
*B01D 57/02* (2006.01)

(52) U.S. Cl. .................. 359/296; 345/107; 204/450
(58) Field of Classification Search ............. 359/296; 345/107, 108; 204/450, 600
See application file for complete search history.

(56) References Cited

U.S. PATENT DOCUMENTS

| | | |
|---|---|---|
| 2,766,478 A | 10/1956 | Raley, Jr. et al. |
| 2,800,457 A | 7/1957 | Green et al. |
| 3,036,388 A | 5/1962 | Tate |
| 3,384,488 A | 5/1968 | Tulagin et al. |
| 3,389,194 A | 6/1968 | Somerville |
| 3,406,363 A | 10/1968 | Tate |
| 3,423,489 A | 1/1969 | Arens et al. |
| 3,460,248 A | 8/1969 | Tate |
| 3,585,381 A | 6/1971 | Hodson et al. |
| 3,617,374 A | 11/1971 | Bellbrook et al. ......... 117/212 |
| 3,912,365 A | 10/1975 | Lowell ........................ 350/160 |
| 3,922,255 A | 11/1975 | Koestler et al. |
| 3,959,906 A | 6/1976 | Norris, Jr. et al. ............ 40/125 |
| 3,990,783 A | 11/1976 | Kohashi ..................... 350/161 |
| 4,001,140 A | 1/1977 | Foris et al. |
| 4,078,856 A | 3/1978 | Thompson et al. ......... 350/362 |
| 4,087,376 A | 5/1978 | Foris et al. |
| 4,123,206 A | 10/1978 | Dannelly |
| 4,126,528 A | 11/1978 | Chiang ....................... 204/180 |
| 4,126,854 A | 11/1978 | Sheridon .................... 340/373 |
| 4,143,103 A | 3/1979 | Sheridon |
| 4,143,472 A | 3/1979 | Murata et al. ................. 35/66 |
| 4,166,800 A | 9/1979 | Fong |
| 4,196,437 A | 4/1980 | Hertz |
| 4,201,691 A | 5/1980 | Asher et al. |
| 4,211,668 A | 7/1980 | Tate |
| 4,261,653 A | 4/1981 | Goodrich |

(Continued)

FOREIGN PATENT DOCUMENTS

| | | |
|---|---|---|
| CH | 563 807 | 7/1975 |
| DE | 195 00 694 A1 | 8/1996 |
| EP | 0 087 193 A2 | 8/1983 |
| EP | 0 268 877 A3 | 6/1988 |

(Continued)

OTHER PUBLICATIONS

Hopper et al., "An Electrophoretic Display, Its Properties, Model, and Addressing," *IEEE Transactions on Electron Devices*, 1979, vol. Ed–26, No. 8, pp. 1148–1152.

Ackerman, "E Ink of Cambridge Gets Start–Up Funding" *Boston Globe*, Dec. 1997, pp. D4.

Ahlers, G., "Experiments on Spatio–Temporal Chaos", *Physica A 249*, 1998, pp. 18–26.

(Continued)

*Primary Examiner*—Evelyn A Lester

(57) ABSTRACT

An electrophoretic display element includes at least one substrate and at least one cell defined by a cell wall. The cell is disposed on the substrate and contains a suspending medium. In some embodiments, the cell has a width that is not greater than about three times a height of the cell wall.

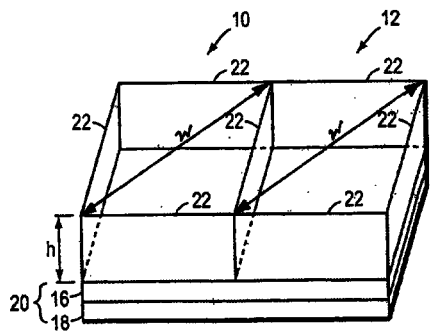

(Amended)

U.S. PATENT DOCUMENTS

| | | | |
|---|---|---|---|
| 4,273,672 A | 6/1981 | Vassiliades | |
| 4,279,632 A | 7/1981 | Frosch | |
| 4,303,433 A | 12/1981 | Torobin | |
| 4,314,013 A | 2/1982 | Chang | |
| 4,330,788 A | 5/1982 | Hinz et al. | 346/157 |
| 4,336,536 A | 6/1982 | Kalt et al. | 340/783 |
| 4,419,383 A | 12/1983 | Lee | |
| 4,435,047 A | 3/1984 | Fergason | 350/334 |
| 4,438,160 A | 3/1984 | Ishikawa et al. | |
| 4,444,961 A | 4/1984 | Timm | |
| 4,453,200 A | 6/1984 | Trcka et al. | 362/31 |
| 4,605,284 A | 8/1986 | Fergason | |
| 4,606,611 A | 8/1986 | Fergason | 350/334 |
| 4,616,903 A | 10/1986 | Fergason | 350/334 |
| 4,623,706 A | 11/1986 | Timm et al. | |
| 4,643,528 A | 2/1987 | Bell, Jr. | |
| 4,666,673 A | 5/1987 | Timm | |
| 4,690,749 A | 9/1987 | Van Alstine et al. | 204/299 |
| 4,707,080 A | 11/1987 | Fergason | |
| 4,726,662 A | 2/1988 | Cromack | |
| 4,741,601 A | 5/1988 | Saito | 350/339 |
| 4,757,235 A | 7/1988 | Nunomura et al. | 313/509 |
| 4,772,102 A | 9/1988 | Fergason et al. | |
| 4,824,208 A | 4/1989 | Fergason et al. | |
| 4,832,458 A | 5/1989 | Fergason et al. | |
| 4,888,140 A | 12/1989 | Schlameus et al. | |
| 4,919,521 A | 4/1990 | Tada et al. | |
| 4,936,916 A | 6/1990 | Shinmitsu et al. | 106/21 |
| 4,937,019 A | 6/1990 | Scott | 261/43 |
| 4,947,157 A | 8/1990 | Di Santo et al. | 340/787 |
| 4,947,219 A | 8/1990 | Boehm | |
| 4,960,351 A | 10/1990 | Kendall, Jr. et al. | |
| 5,017,225 A | 5/1991 | Nakanishi et al. | |
| 5,040,960 A | 8/1991 | Shioya et al. | |
| 5,057,244 A | 10/1991 | Nitta et al. | 252/501.1 |
| 5,057,363 A | 10/1991 | Nakanishi | |
| 5,067,021 A | 11/1991 | Brody | 358/241 |
| 5,082,351 A | 1/1992 | Fergason | |
| 5,105,185 A | 4/1992 | Nakanowatari et al. | |
| 5,151,032 A | 9/1992 | Igawa | |
| 5,155,607 A | 10/1992 | Inoue et al. | 359/51 |
| 5,160,371 A | 11/1992 | Ito | 106/19 |
| 5,179,065 A | 1/1993 | Ito | 106/21 |
| 5,185,226 A | 2/1993 | Grosso et al. | |
| 5,208,066 A | 5/1993 | Fujisaki et al. | 427/96 |
| 5,208,686 A | 5/1993 | Fergason | 349/79 |
| 5,216,530 A | 6/1993 | Pearlman et al. | |
| 5,260,002 A | 11/1993 | Wang | |
| 5,262,098 A | 11/1993 | Crowley et al. | |
| 5,266,098 A | 11/1993 | Chun et al. | |
| 5,270,843 A | 12/1993 | Wang | |
| 5,273,920 A | 12/1993 | Kwasnick et al. | 437/40 |
| 5,276,113 A | 1/1994 | Hashiguchi et al. | |
| 5,279,773 A | 1/1994 | Saxe | 252/585 |
| 5,294,820 A | 3/1994 | Gemma et al. | 257/324 |
| 5,303,073 A | 4/1994 | Shirota et al. | |
| 5,326,484 A | 7/1994 | Nakashima et al. | |
| 5,344,594 A | 9/1994 | Sheridon | |
| 5,383,041 A | 1/1995 | Yamazaki et al. | 359/59 |
| 5,389,945 A | 2/1995 | Sheridon | |
| 5,411,398 A | 5/1995 | Nakanishi et al. | |
| 5,462,887 A | 10/1995 | Glück | 437/48 |
| 5,463,491 A | 10/1995 | Check, III | 359/296 |
| 5,463,492 A | 10/1995 | Check, III | |
| 5,490,005 A | 2/1996 | Jueliger | 359/72 |
| 5,500,538 A | 3/1996 | Yamazaki et al. | 257/49 |
| 5,530,567 A | 6/1996 | Takei | 359/51 |
| 5,536,932 A | 7/1996 | Hack et al. | 250/208.1 |
| 5,541,478 A | 7/1996 | Troxell et al. | 313/497 |
| 5,543,219 A | 8/1996 | Elwakil | |
| 5,556,583 A | 9/1996 | Tashiro | |
| 5,571,268 A | 11/1996 | Azibert | 277/39 |
| 5,571,741 A | 11/1996 | Leedy | 437/51 |
| 5,583,369 A | 12/1996 | Yamazaki et al. | 257/635 |
| 5,598,169 A | 1/1997 | Drabeck et al. | 343/701 |
| 5,600,172 A | 2/1997 | McDevitt et al. | 257/436 |
| 5,619,353 A | 4/1997 | Yamazaki et al. | 349/89 |
| 5,643,506 A | 7/1997 | Rourke | |
| 5,650,872 A | 7/1997 | Saxe et al. | |
| 5,663,739 A | 9/1997 | Pommerenke et al. | 345/1 |
| 5,671,994 A | 9/1997 | Tai et al. | 362/31 |
| 5,673,148 A | 9/1997 | Morris et al. | 359/536 |
| 5,677,719 A | 10/1997 | Granzow | 347/103 |
| 5,699,097 A | 12/1997 | Takayama et al. | 347/171 |
| 5,708,525 A | 1/1998 | Sheridon | |
| 5,710,070 A | 1/1998 | Chan | 438/21 |
| 5,715,026 A | 2/1998 | Shannon | 349/49 |
| 5,716,508 A * | 2/1998 | Starr | 204/618 |
| 5,717,283 A | 2/1998 | Biegelsen et al. | |
| 5,717,514 A | 2/1998 | Sheridon | |
| 5,717,515 A | 2/1998 | Sheridon | |
| 5,733,804 A | 3/1998 | Hack et al. | 438/158 |
| 5,736,074 A | 4/1998 | Hayes et al. | 264/6 |
| 5,737,115 A | 4/1998 | Mackinlay et al. | |
| 5,739,801 A | 4/1998 | Sheridon | |
| 5,745,094 A | 4/1998 | Gordon, II et al. | |
| 5,751,268 A | 5/1998 | Sheridon | |
| 5,754,332 A | 5/1998 | Crowley | |
| 5,759,671 A | 6/1998 | Tanaka et al. | |
| 5,760,761 A | 6/1998 | Sheridon | |
| 5,767,826 A | 6/1998 | Sheridon et al. | |
| 5,777,782 A | 7/1998 | Sheridon | |
| 5,779,869 A | 7/1998 | Helfer et al. | 204/606 |
| 5,783,614 A | 7/1998 | Chen et al. | |
| 5,808,783 A | 9/1998 | Crowley | |
| 5,815,306 A | 9/1998 | Sheridon et al. | 359/296 |
| 5,825,529 A | 10/1998 | Crowley | |
| 5,828,082 A | 10/1998 | Wu | 257/57 |
| 5,847,413 A | 12/1998 | Yamazaki et al. | 257/69 |
| 5,874,746 A | 2/1999 | Holmberg et al. | 257/59 |
| 5,880,705 A | 3/1999 | Onyskevych et al. | 345/80 |
| 5,894,367 A | 4/1999 | Sheridon | |
| 5,900,858 A | 5/1999 | Richley | |
| 5,914,698 A | 6/1999 | Nicholson et al. | 345/1 |
| 5,917,199 A | 6/1999 | Byun et al. | 257/59 |
| 5,922,268 A | 7/1999 | Sheridon | 264/437 |
| 5,930,026 A | 7/1999 | Jacobson et al. | |
| 5,946,561 A | 8/1999 | Yamazaki et al. | 438/166 |
| 5,958,169 A | 9/1999 | Titterington et al. | |
| 5,972,493 A | 10/1999 | Iwasaki et al. | 428/323 |
| 5,982,346 A | 11/1999 | Sheridon et al. | 345/85 |
| 5,986,622 A | 11/1999 | Ong | 345/1 |
| 5,989,945 A | 11/1999 | Yudasaka et al. | 438/149 |
| 5,993,850 A | 11/1999 | Sankaram et al. | 424/450 |
| 5,993,851 A | 11/1999 | Foldvari | 424/450 |
| 6,014,247 A | 1/2000 | Winter et al. | |
| 6,017,584 A | 1/2000 | Albert et al. | 427/213.3 |
| 6,020,223 A | 2/2000 | Mei et al. | 438/158 |
| 6,025,896 A | 2/2000 | Hattori et al. | 349/86 |
| 6,031,594 A | 2/2000 | Engle | 349/158 |
| 6,045,955 A | 4/2000 | Vincent | |
| 6,055,091 A | 4/2000 | Sheridon et al. | 359/296 |
| 6,064,091 A | 5/2000 | Deane et al. | 257/347 |
| 6,064,784 A | 5/2000 | Whitehead et al. | 385/18 |
| 6,067,185 A | 5/2000 | Albert et al. | |
| 6,087,196 A | 7/2000 | Sturm et al. | 438/29 |
| 6,097,531 A | 8/2000 | Sheridon | 359/296 |
| 6,103,269 A | 8/2000 | Wunderlich et al. | 424/489 |
| 6,117,368 A | 9/2000 | Hou | |
| 6,118,426 A | 9/2000 | Albert et al. | |
| 6,120,588 A | 9/2000 | Jacobson | 106/31.16 |

| | | | | | | |
|---|---|---|---|---|---|---|
| 6,120,839 A | 9/2000 | Comiskey et al. ....... 427/213.3 | JP | 43 07523 | 10/1992 |
| 6,124,851 A | 9/2000 | Jacobson .................... 345/206 | JP | 04 307523 A | 10/1992 |
| 6,130,773 A | 10/2000 | Jacobson et al. ........... 359/296 | JP | 04 345133 A | 12/1992 |
| 6,130,774 A | 10/2000 | Albert et al. ............... 359/296 | JP | 05 035188 | 2/1993 |
| 6,140,980 A | 10/2000 | Spitzer et al. .................. 345/8 | JP | 05 165064 A | 6/1993 |
| 6,144,361 A * | 11/2000 | Gordon et al. .............. 345/107 | JP | 05 173194 A | 7/1993 |
| 6,172,798 B1 | 1/2001 | Albert et al. ............... 359/296 | JP | 05 307197 A | 11/1993 |
| 6,177,921 B1 | 1/2001 | Comiskey et al. .......... 345/107 | JP | 07 036020 | 2/1995 |
| 6,197,663 B1 | 3/2001 | Chandross et al. ......... 438/455 | JP | 08 006508 | 1/1996 |
| 6,225,971 B1 | 5/2001 | Gordon, II et al. | JP | 08006508 | 1/1996 |
| 6,228,668 B1 | 5/2001 | Silverbrook ................. 438/21 | JP | 09 006508 | 1/1996 |
| 6,232,135 B1 | 5/2001 | Ashe et al. ................... 438/21 | JP | 08 234176 | 9/1996 |
| 6,232,950 B1 | 5/2001 | Albert et al. ............... 345/107 | JP | 08 321621 | 12/1996 |
| 6,239,896 B1 | 5/2001 | Ikeda | JP | 10-149118 A | 6/1998 |
| 6,262,706 B1 | 7/2001 | Albert et al. | JP | 10-149118 | 6/1998 |
| 6,262,833 B1 | 7/2001 | Loxley et al. | JP | 11 352526 | 12/1999 |
| 6,265,249 B1 | 7/2001 | Wu ............................. 438/158 | JP | 00 127478 | 5/2000 |
| 6,267,905 B1 | 7/2001 | Silverbrook ................. 216/27 | JP | 00 137250 | 5/2000 |
| 6,271,823 B1 | 8/2001 | Gordon, II et al. | JP | 00 171839 | 6/2000 |
| 6,278,142 B1 | 8/2001 | Hynecek ..................... 257/247 | JP | 00 194020 | 7/2000 |
| 6,287,899 B1 | 9/2001 | Park et al. .................. 438/149 | JP | 00 194021 | 7/2000 |
| 6,300,932 B1 | 10/2001 | Albert ........................ 345/107 | JP | 00 227612 | 8/2000 |
| 6,312,304 B1 | 11/2001 | Duthaler et al. .............. 445/24 | JP | 00 258805 | 9/2000 |
| 6,323,989 B1 | 11/2001 | Jacobson et al. ........... 359/296 | JP | 00 259102 | 9/2000 |
| 6,538,801 B1 * | 3/2003 | Jacobson et al. ........... 359/296 | JP | 00 285219 | 10/2000 |
| 6,672,921 B1 * | 1/2004 | Liang et al. .................. 445/24 | JP | 00 321605 | 11/2000 |
| 2004/0017349 A1 * | 1/2004 | Kawai ........................ 345/107 | JP | 00 322002 | 11/2000 |
| | | | JP | 00 322003 | 11/2000 |
| | FOREIGN PATENT DOCUMENTS | | JP | 00 322004 | 11/2000 |
| | | | JP | 00 322005 | 11/2000 |
| EP | 0 268 877 A2 | 6/1988 | JP | 00 322006 | 11/2000 |
| EP | 0 540 281 A2 | 5/1993 | JP | 00 322007 | 11/2000 |
| EP | 0 555 982 B1 | 8/1993 | JP | 00 352946 | 12/2000 |
| EP | 0 555 982 A1 | 8/1993 | JP | 01 005040 | 1/2001 |
| EP | 0 585 000 A2 | 3/1994 | JP | 01 020093 | 1/2001 |
| EP | 0 585 000 A3 | 3/1994 | JP | 01 033831 | 2/2001 |
| EP | 0 612 102 A2 | 8/1994 | JP | 01 045412 | 2/2001 |
| EP | 0 629 003 A1 | 12/1994 | JP | 01 051490 | 2/2001 |
| EP | 0 721 176 A3 | 7/1996 | JP | 01 056653 | 2/2001 |
| EP | 0 721 176 A2 | 7/1996 | JP | 06 239896 | 5/2001 |
| EP | 0 739 020 A2 | 10/1996 | WO | WO 94/11772 | 5/1994 |
| EP | 0 600 878 B1 | 2/1997 | WO | WO 94/16427 | 6/1994 |
| EP | 0 778 083 A1 | 6/1997 | WO | WO 97/01165 | 1/1997 |
| EP | 0 962 808 A2 | 12/1999 | WO | WO 97/01166 | 1/1997 |
| EP | 0 685 101 B1 | 4/2000 | WO | WO 97/15959 | 5/1997 |
| EP | 0 708 798 B1 | 4/2000 | WO | WO 98/03896 | 1/1998 |
| EP | 1 020 920 A2 | 7/2000 | WO | WO 98/19208 | 5/1998 |
| EP | 1 024 540 A2 | 8/2000 | WO | WO 98/30749 | 7/1998 |
| GB | 2 292 119 A | 2/1996 | WO | WO 98/41898 | 9/1998 |
| JP | 54 152497 A | 11/1979 | WO | WO 98/41899 | 9/1998 |
| JP | 55096922 | 7/1980 | WO | WO 99/03626 | 1/1999 |
| JP | 59-162057 A | 9/1984 | WO | WO 99/10767 | 3/1999 |
| JP | 62200335 A | 9/1987 | WO | WO 99/27414 | 6/1999 |
| JP | 62200336 A | 9/1987 | WO | WO 99/39373 | 8/1999 |
| JP | 62231930 | 10/1987 | WO | WO 99/53373 | 10/1999 |
| JP | 01177517 | 1/1988 | WO | WO 99/59101 | 11/1999 |
| JP | 01 086116 A | 3/1989 | WO | WO 00/03291 | 1/2000 |
| JP | 01 086117 A | 3/1989 | WO | WO 00/03349 | 1/2000 |
| JP | 1125613 A | 5/1989 | WO | WO 00/05704 | 2/2000 |
| JP | 01142537 A | 6/1989 | WO | WO 00/08689 | 2/2000 |
| JP | 02 223934 A | 9/1990 | WO | WO 00/20921 | 4/2000 |
| JP | 02 223935 A | 9/1990 | WO | WO 00/20922 | 4/2000 |
| JP | 02 223936 A | 9/1990 | WO | WO 00/20923 | 4/2000 |
| JP | 02 284124 A | 11/1990 | WO | WO 00/3666 | 6/2000 |
| JP | 02 284125 A | 11/1990 | WO | WO 00/36465 | 6/2000 |
| JP | 30 53224 | 3/1991 | WO | WO 00/36560 | 6/2000 |
| JP | 30 91772 | 4/1991 | | | |
| JP | 30 96925 | 4/1991 | | | |
| JP | 4029291 A | 1/1992 | WO | WO 01/11424 A1 | 2/2001 |
| JP | 4060518 A | 2/1992 | WO | WO 01/67170 A1 | 9/2001 |
| JP | 04 086785 A | 3/1992 | | | |
| JP | 04 212990 A | 8/1992 | | | |

OTHER PUBLICATIONS

Amundson, K. et al, "Flexible, Active–Matrix Display Constructed Using a Microencapsulated Electrophoretic Material and an Organic–Semiconductor–Based Backplane", *SID 2001 Digest*, pp. 160–163.

Berst, J., Anchor Desk, "E–Paper Here Sooner Than You Think", Nov. 20, 2000, http:/www.zdnet.com/filters/printer-friendly/0,6061,2656348–10,00.html.

Blazo, Stephen F., "High Resolution Electrophoretic Display with Photoconductor Addressing," *SID International Symposium*, U.S., Coral Gables, Winner, vol. SYMP, 13, pp. 92–93. (1982).

BusinessWire, "EInk and Lucent Technologies Demonstrate World's First Flexible Electronic Ink Display with Plastic Transistors", (Nov. 2000).

Butler, D., "Electronic Ink for Current Issues," *Nature*, 2001, vol. 411, p. 5.

Chen, Y. et al, "A Conformable Electronic Ink Display Using a Foil–Based a–Si TFT Array", SID 2001 Digest, pp. 157–159.

Comiskey et al., "Late–News Paper: Electrophoretic Ink: A Printable Display Material," *SID 97 Digest*, 1997, pp. 75–76.

Comiskey et al., "An Electrophoretic Ink for All–Printed Reflective Electronic Displays," *Nature*, Jul. 1998, vol. 394, pp. 253–255.

Dalisa, "Electrophoretic Displays," pp. 215–232, no date or source.

Drzaic et al., "A Printed and Rollable Bistable Electronic Display", *SID 98 Digest*, 1998, vol. 29, pp. 1131–1134.

Duthaler et al., "Active–Matrix Color Displays Using Electrophoretic Ink and Color Filters," *SID 02 Digest*, 1374–1377, (2002).

Edwards, J., "Easy Writer," *CIO*, Aug. 1, 2001.

Esen, "Synthesis of Spherical Microcapsules by Photopolymerization in Aerosols," *Colloid & Polymer Science*, vol. 275, No. 2, 1997, pp. 131–137.

Fitzhenry, "Identification of a Charging Mechanism Using Infrared Spectroscopy," *Applied Spectroscopy*, vol. 33, No. 2, 1979, pp. 107–110.

Franjione, et al., "The Art and Science of Microencapsulation," *Technology Today*, Jun. 1995.

Guernsey, "Beyond Neon: Electronic Ink," *New York Times*, Jun. 1999, p. B11.

Gutcho, "Additional Uses for Encapsulated Products," *Microencapsules and Microencapsulation Techniques*, 1976, pp. 278–343.

Gutcho, "Capsule Wall Treatment," *Microencapsules and Microencapsulation Techniques*, 1976, pp. 156–177.

Gutcho, "Microencapsulation with Synthetic Polymeric Film Formers," *Microcapsules and Microencapsulation Techniques*, 1976, pp. 65–130.

Gutcho, "Pigments and Paints," *Microcapsules and Microencapsulation Techniques*, 1976, pp. 178–193.

Jacobson, "The last book," *IBM Systems Journal*, 1997, vol. 36, No. 3, pp. 457–463.

Kazlas, P. et al, "SVGA Microencapsulated Electrophoretic Active Matrix Display for Information Appliances", SID 2001 Digest, pp. 152–155.

Kenward, "Display a Winning Glow," *Technology Review*, Jan./Feb. 1999, pp. 69–73.

Klein, "Will the Future Be Written in E–Ink," *The Wall Street Journal*, Jan. 4, 2000.

Lee, "A Magnetic–Particles Display," *Proceeding of the S.I.D.*, 1975, vol. 16, No. 3, pp. 177–184.

Lewis, "Electrophoretic Displays," pp. 223–240, no date or source.

Matsumoto et al., "Generation of Monodispersed Concentric Two Phase Droplets for Encapsulation," pp. 63–67, no date or source.

Matsumoto et al., "A Production Process for Uniform–Size Polymer Particles," *Journal of chemical Engineering of Japan*, 1989, vol. 22, No. 6, pp. 691–694.

Matsumoto et al., "Production of Monodispersed Capsules," *J. Microencapsulation*, 1986, vol. 3, No. 1, pp. 25–31.

Minnema et al., "Pattern Generation in Polyimide Coatings and Its Application in an Electrophoretic Image Display," *Polymer Engineering and Science*, Jun. 1988, vol. 28, No. 12, pp. 815–822.

Murau, "Characteristics of an X–Y Addressed Electrophoretic Image Display (EPID)," *SID 84 Digest*, 1984, pp. 141–144.

Nakamura et al., "Development of Electrophoretic Display Using Microcapsulated Suspension," *SID 98 Digest*, 1998, pp. 1014–1017.

Negroponte et al., "Surfaces and Displays," *Wired*, Jan. 1997, p. 212.

Pitt, "Power Consumption of Micro–encapsulated Electrophoretic Displays for Smart Handheld Applications," *SID 02 Digest*, 1378–1381, (2002).

Platt, "Digital Ink," *Wired*, 1997, pp. 162, 165, 208, 209, 211.

Saitoh et al., "A Newly Developed Electrical Twisting Ball Display," *Proceedings of the SID*, 1982, vol. 23, No. 4, pp. 249–253.

Sankus, "Electrophoretic Display Cell," *Xerox Disclosure Journal*, May/Jun. 1979, vol. 4, No. 3, p. 309.

Sheridon et al., "The Gyricon—A Twisting Ball Display," *Proceedings of the SID*, 1977, vol. 18, Nos. 3 & 4, pp. 289–293.

Sirringhaus, "Integrated Optoelectronic Devices Based on Conjugated Polymers," *Science*, 1998, vol. 280, pp. 1741–1744.

Soule, C.A., "E Ink Pens Deal with Lucent", Mass. High Technology, Jul. 10, 2000, 3 pgs.

"Electronic Book is a Whole Library," *Sunday Times Newspaper*, Feb. 1996.

Vandegaer, "Microencapsulation: Processes and Applications", ed., American Chemical Society Symposium, Chicago, IL, 1973, pp. V–x, 1–180 (published by Plenum Press, New York, 1974).

Webber, "10.4: Image Stability in Active–Matrix Microencapsulated Electrophoretic Displays," *SID 02 Digest*, pp. 126–129, (2002).

Harbour, et al., "Subdivided Electrophoretic Display," Xerox Disclosure Journal, vol. 4, No. 6, p. 705 (1979), (XP002123212).

Chiang, "Reduction of Lateral Migration in Matrix Addressed Electrophoretic Display," Xerox Disclosure Journal, vol. 5, No. 1, pp. 73–74 (1980), (XP–002141181).

* cited by examiner

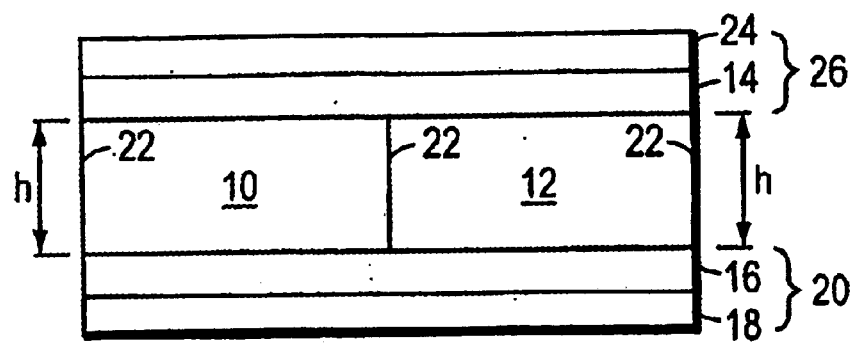
FIG. 1 (Amended)
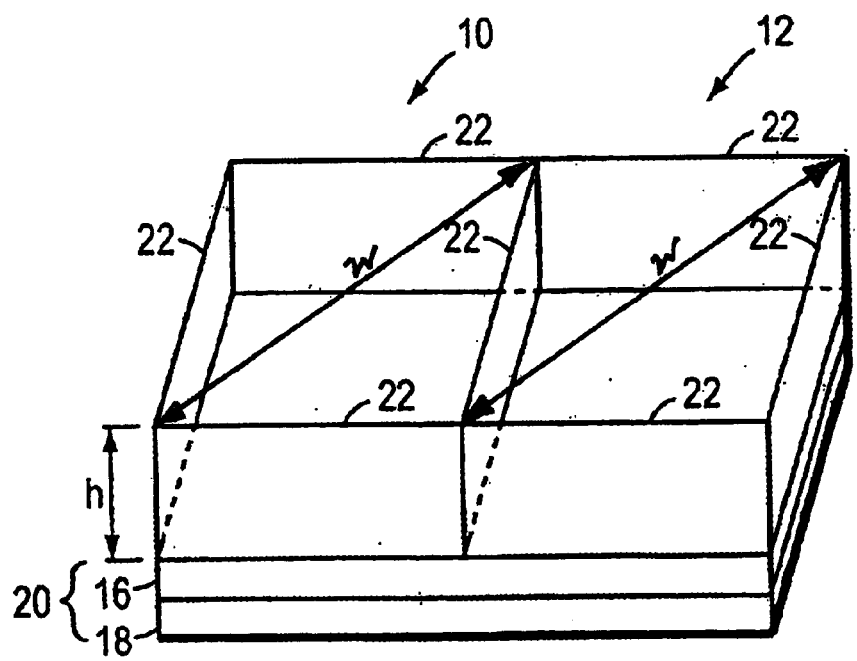
FIG. 2 (Amended)

US 6,327,072 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

THE DRAWING FIGURES HAVE BEEN CHANGED AS FOLLOWS:

FIG. 1—"w" has been deleted.
FIG. 2—corrected indication of "w" added.

AS A RESULT OF REEXAMINATION, IT HAS BEEN DETERMINED THAT:

Claims 1–3, 7–10 and 12–14 are determined to be patentable as amended.

Claims 4–6 and 11, dependent on an amended claim, are determined to be patentable.

New claims 15–31 and 32–57 are added and determined to be patentable.

1. An electrophoretic display element comprising:
   at least one substrate and
   at least one cell, the cell defined by a cell wall and disposed on the substrate, wherein the cell has a [width] *greatest lateral dimension* that is *less than 70 micrometers and* not greater than about three times a height of the cell wall.

2. The element of claim 1 wherein the cell has a [width] *greatest lateral dimension* that is from about two to about three times a height of the cell wall.

3. The element of claim 1 in which the cell wall *has a lateral dimension that* is less than 10 micrometers [wide].

7. The element of claim 1 wherein the substrate is permeable to a suspending fluid and substantially impermeable to electrophoretic particles, such that the suspending fluid and the particles fill a cavity defined by the cell [walls] *wall*.

8. The element of claim 1 wherein the substrate is coated with a polymer, the polymer being insoluble in a suspending medium contained within a cavity defined by the cell [walls] *wall*.

9. The element of claim 1 wherein a suspending fluid contained within a cavity defined by the cell [walls] *wall* comprises a substantially clear liquid.

10. The element of claim 1 wherein the [width] *greatest lateral dimension* is in the range of 5 to [200] *70* micrometers.

12. An electrophoretic display element comprising at least one substrate and at least one cell defined by a cell wall and disposed on the substrate, the cell *comprising a greatest lateral dimension and* containing a suspending medium and a plurality of electrophoretic particles, wherein the cell has a shape that minimizes hydrodynamic motion within the suspending medium *and wherein the greatest lateral dimension is less than about one and one half wavelengths of a convective current in the cell*.

13. The element of claim 12 wherein the hydrodynamic motion comprises [a] *the* convective current.

14. The element of claim 13 wherein [the] *a* height *of the cell wall* is in the range of 10 to 100 micrometers.

15. *The element of claim 8 wherein the polymer seals the cavity once the polymer is cured.*

16. *The element of claim 10, wherein the greatest lateral dimension is in a range of about 10 to about 70 micrometers.*

17. *The element of claim 10, wherein the greatest lateral dimension is in a range of about 50 to about 70 micrometers.*

18. *The element of claim 11, wherein the greatest lateral dimension is in a range of about 5 to about 70 micrometers.*

19. *The element of claim 11, wherein the height is in a range of about 20 to about 50 micrometers.*

20. *The element of claim 1, wherein the greatest lateral dimension is no more than two times the height of the cell wall.*

21. *The element of claim 1, wherein the height of the cell wall is the height of the cell.*

22. *The element of claim 1, wherein the at least one substrate comprises a top substrate bonded to seal an interior of the cell.*

23. *The element of claim 1, wherein the at least one substrate comprises a top substrate bonded to the cell wall.*

24. *The element of claim 1, wherein the at least one substrate comprises a top substrate and a bottom substrate that seal the cell.*

25. *The element of claim 1, wherein the cell wall has a lateral dimension that is about 3 to about 5 micrometers.*

26. *The element of claim 1 further comprising a suspending medium contained by the cell, and wherein the height and the greatest lateral dimension are associated with a cell shape that reduces hydrodynamic motion within the suspending medium.*

27. *The element of claim 12, wherein the cell has a greatest dimension that is not greater than about three times a height of the cell wall.*

28. *The element of claim 27 wherein the greatest lateral dimension is in a range of about two to about three times a height of the cell wall.*

29. *The element of claim 27 wherein the greatest lateral dimension is at most two times a height of the cell wall.*

30. *The element of claim 12, wherein the substrate comprises a control grid electrode structure.*

31. *The element of claim 12, wherein the cell wall is formed at least in part with a technique selected from the group consisting of photolithography, sandblasting, screenprinting, embossing, laser etching and radiation curing.*

32. *The element of claim 12 in which the cell wall has a lateral dimension that is less than 10 micrometers.*

33. *The element of claim 32, wherein the cell wall has a lateral dimension that is about 3 to about 5 micrometers.*

34. *The element of claim 12 wherein the cell comprises two laminated structures.*

35. *The element of claim 12 wherein the substrate is permeable to the suspending medium and substantially impermeable to the plurality of electrophoretic particles.*

36. *The element of claim 12 wherein the element further comprises a polymer coating the substrate, the polymer being insoluble in a suspending medium contained within the cell.*

37. *The element of claim 12 wherein the suspending medium comprises a substantially clear liquid.*

38. *The element of claim 12, wherein the cell has a greatest lateral dimension in a range of about 5 to about 70 micrometers.*

39. *The element of claim 38, wherein the greatest lateral dimension is in a range of about 10 to about 100 micrometers.*

40. The element of claim 38, wherein the greatest lateral dimension is in a range of about 50 to about 120 micrometers.

41. The element of claim 12, wherein the cell has a height that is in a range of about 10 to 100 micrometers.

42. The element of claim 41, wherein the cell has a greatest lateral dimension in a range of about 5 to about 200 micrometers.

43. The element of claim 42, wherein the height is in a range of about 20 to about 50 micrometers.

44. The element of claim 12, the greatest lateral dimension is at most one wavelength of the convection current in the cell.

45. The element of claim 12, wherein the at least one substrate comprises a top substrate bonded to seal an interior of the cell.

46. The element of claim 12, wherein the at least one substrate comprises a top substrate bonded to the cell wall.

47. The element of claim 12, wherein the at least one substrate comprises a top substrate and a bottom sustrate that seal the cell.

48. The element of claim 12, wherein the greatest lateral dimension is no more than two times the height of the cell wall.

49. The element of claim 12, wherein the height of the cell wall is the height of the cell.

50. An electrophoretic display element comprising:

at least one substrate;

at least one cell, the cell defined by a cell wall and disposed on the substrate, wherein the cell has a greatest lateral dimension that is not greater than about three times a height of the cell wall; and wherein the substrate is permeable to a suspending fluid and substantially impermeable to electrophoretic particles, such that the suspending fluid and the particles fill a cavity defined by the cell wall.

51. An electrophoretic display element comprising:

at least one substrate;

at least one cell, the cell defined by a cell wall and disposed on the substrate, the cell wall defining a cavity containing a suspending medium, the cell having a greatest lateral dimension that is not greater than about three times a height of the cell wall; and wherein the substrate is coated with a polymer that is insoluble in the suspending medium.

52. The element of claim 51 wherein the the polymer seals the cavity once the polymer is cured.

53. An electrophoretic display element comprising:

at least one substrate;

at least one cell, the cell defined by a cell wall and disposed on the substrate, wherein the cell has a greatest lateral dimension that is not greater than about three times a height of the cell wall; and wherein a suspending fluid contained within a cavity by the cell wall comprises a substantially clear liquid.

54. An electrophoretic display element comprising at least one substrate and at least one cell defined by a cell wall and disposed on the substrate, the cell comprising a greatest lateral dimension and containing a suspending medium and a plurality of electrophoretic particles, wherein the cell has a shape that minimizes hydrodynamic motion within the suspending medium, wherein the substrate is permeable to the suspending medium and substantially impermeable to the plurality of electrophoretic particles.

55. An electrophoretic display element comprising at least one substrate and at least one cell defined by a cell wall and disposed on the substrate, the cell comprising a greatest lateral dimension and containing a suspending medium and a plurality of electrophoretic particles, wherein the cell has a shape that minimizes hydrodynamic motion within the suspending medium and the substrate is coated with a polymer insoluble in the suspending medium.

56. The element of claim 55 wherein the polymer seals the cell once the polymer is cured.

57. An electrophoretic display element comprising at least one substrate and at least one cell defined by a cell wall and disposed on the substrate, the cell comprising a greatest lateral dimension and containing a suspending medium and a plurality of electrophoretic particles, wherein the cell has a shape that minimizes hydrodynamic motion within the suspending medium and the suspending medium comprises a substantially clear liquid.

\* \* \* \* \*